(12) United States Patent
Sato et al.

(10) Patent No.: US 11,127,958 B2
(45) Date of Patent: Sep. 21, 2021

(54) CELL UNIT

(71) Applicant: Nissan Motor Co., Ltd., Yokohama (JP)

(72) Inventors: Kazuyuki Sato, Kanagawa (JP); Manabu Sugino, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/960,926

(22) PCT Filed: Jan. 29, 2018

(86) PCT No.: PCT/JP2018/002691
§ 371 (c)(1),
(2) Date: Jul. 9, 2020

(87) PCT Pub. No.: WO2019/146101
PCT Pub. Date: Aug. 1, 2019

(65) Prior Publication Data
US 2020/0335804 A1    Oct. 22, 2020

(51) Int. Cl.
*H01M 8/0258* (2016.01)
*H01M 8/0247* (2016.01)
*H01M 8/124* (2016.01)

(52) U.S. Cl.
CPC ....... *H01M 8/0258* (2013.01); *H01M 8/0247* (2013.01); *H01M 2008/1293* (2013.01)

(58) Field of Classification Search
CPC ....... H01M 2008/1293; H01M 8/0258; H01M 8/0247
See application file for complete search history.

(56) References Cited

U.S. PATENT DOCUMENTS

| 9,455,454 B2 | 9/2016 | Okuyama et al. |
| 2005/0221146 A1 | 10/2005 | Horiguchi |
| 2015/0303491 A1 | 10/2015 | Choi et al. |
| 2019/0260039 A1* | 8/2019 | Yajima ............... H01M 8/0258 |

FOREIGN PATENT DOCUMENTS

| CA | 3 020 251 A1 | 10/2017 |
| EP | 0 424 732 A1 | 5/1991 |
| JP | 2005-285685 A | 10/2005 |
| JP | 2007-35321 A | 2/2007 |
| JP | 2011-119230 A | 6/2011 |
| JP | 2013-182829 A | 9/2013 |
| WO | 2009/054663 A2 | 4/2009 |
| WO | 2013/001777 A1 | 1/2013 |

* cited by examiner

*Primary Examiner* — Milton I Cano
*Assistant Examiner* — Jenna Shulman
(74) *Attorney, Agent, or Firm* — Global IP Counselors, LLP

(57) ABSTRACT

A cell unit is provided for a solid oxide fuel cell, and has a sequential stack of a power generation cell, an auxiliary collector layer and a separator. The power generation cell includes a cathode layer, an electrolyte layer, and an anode layer. The auxiliary collector layer assists electrical contact. The separator is provided with flow passage portions that define a gas flow passage for gas. The auxiliary collector layer has a curved in an arch shape that is disposed so as to overlap the gas flow passage in the stacking direction, and that is curved so as to project toward the power generation cell side.

18 Claims, 9 Drawing Sheets

CELL UNIT

CROSS-REFERENCE TO RELATED APPLICATIONS

This application is a U.S. national stage application of International Application No. PCT/JP2018/002691, filed on Jan. 29, 2018.

BACKGROUND

Technical Field

The present invention relates to a cell unit for a fuel cell stack.

Background Information

A fuel cell stack is configured by stacking a plurality of cell units, each including a power generation cell that generates power by means of supplied gas, and a separator that defines flow passages for the gas.

For example, Japanese Laid Open Patent Application No. 2007-35321 (Patent Document 1) discloses a cell unit in which an auxiliary collector layer is embedded in an electrode of a power generation cell in order to reduce contact resistance between the auxiliary collector layer and the power generation cell.

SUMMARY

However, in the cell unit according to the above-described Patent Document 1, since the auxiliary collector layer is embedded in the electrode, there are cases in which the contact resistance between the separator and the auxiliary collector layer increases. As a result, the contact resistance of the cell unit may increase and the electron conductivity may become insufficient.

In general, if the contact between the separator and the auxiliary collector layer is increased in order to reduce the contact resistance to improve the electron conductivity, the gas flow passage becomes smaller and gas diffusibility decreases. On the other hand, if an attempt is made to increase the gas flow passage in order to secure the gas diffusibility, the contact surface pressure between the auxiliary collector layer and the flow passage portion of the separator is lost, and the contact resistance increases.

An object of the present invention is to provide a cell unit that can attain both good gas diffusibility and good electron conductivity.

A cell unit according to the present invention which achieves the object described above by a sequential stack of a power generation cell that includes a cathode layer, an electrolyte layer, and an anode layer, an auxiliary collector layer that assists electrical contact, and a separator provided with a flow passage portion that defines a gas flow passage. The auxiliary collector layer has a curved portion that is disposed so as to overlap the gas flow passage in the stacking direction, and that is curved so as to project toward the power generation cell side.

DETAILED DESCRIPTION OF EMBODIMENTS

Figure 1:
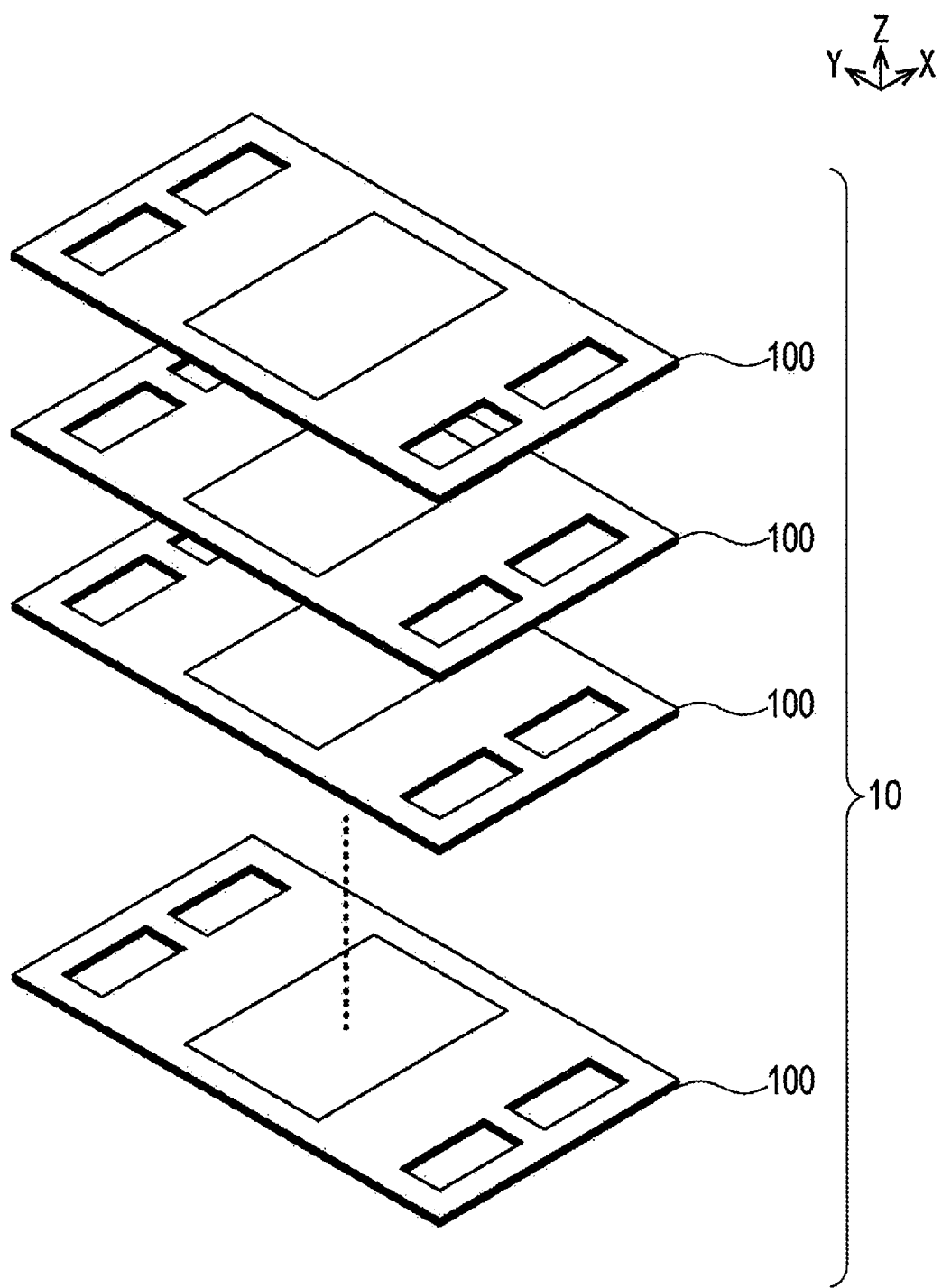
FIG. 1 is an exploded perspective view illustrating a fuel cell stack according to a first embodiment.

Embodiments of the present invention will be explained below with reference to the appended drawings. The description below does not limit the technical scope or the meanings of the terms described in the Claims. Dimensional ratios in the drawings are exaggerated for the sake of convenience of explanation and may differ from actual ratios.

First Embodiment

A cell unit 100 according to a first embodiment will be described with reference to FIGS. 1 to 7. The cell unit 100 according to the present embodiment is used for a solid oxide fuel cell (SOFC), which uses an oxide ion conductor such as stabilized zirconia as an electrolyte.

For the sake of convenience of the explanation below, an XYZ orthogonal coordinate system is shown is the drawings. The x-axis and the y-axis represent axes that are parallel with the horizontal direction, and the z-axis represents an axis that is parallel with the vertical direction.

FIG. 1 is an exploded perspective view illustrating a fuel cell stack 10 according to a first embodiment, configured by stacking a plurality of the cell units 100 in the vertical direction. The vertical direction of the fuel cell stack 10 represented by the z-axis in the drawings is also referred to as the "stacking direction."

Cell Unit 100

Figure 2:
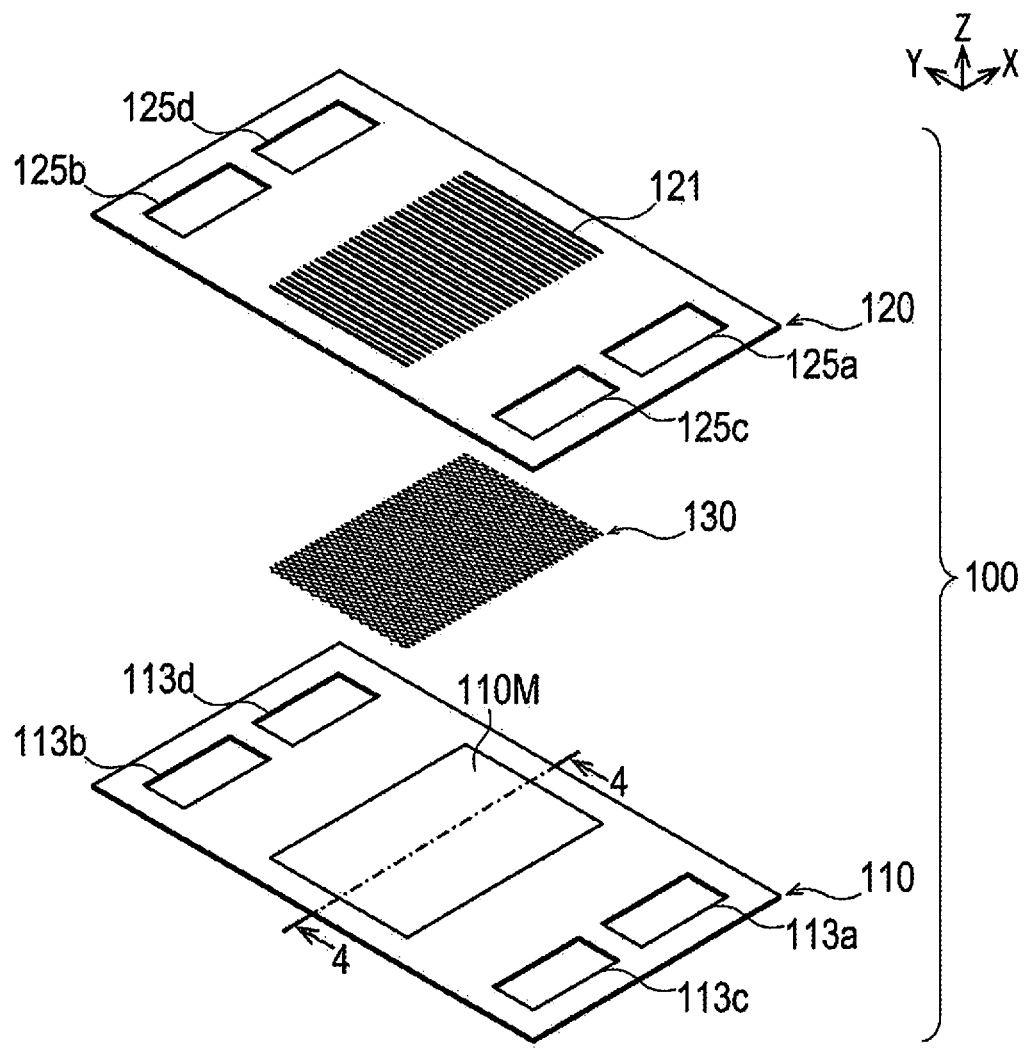
FIG. 2 is an exploded perspective view of the cell unit shown in FIG. 1.

FIG. 2 is an exploded perspective view of the cell unit 100. As shown in FIG. 2, the cell unit 100 is configured by sequentially stacking a metal support cell assembly 110, an auxiliary collector layer 130, and a separator 120 provided with flow passage portions 121 that define gas flow passages F for a gas including anode gas and cathode gas. A contact material may be disposed between the metal support cell assembly 110 and the auxiliary collector layer 130 so as to bring the two into conductive contact.

Figure 3:
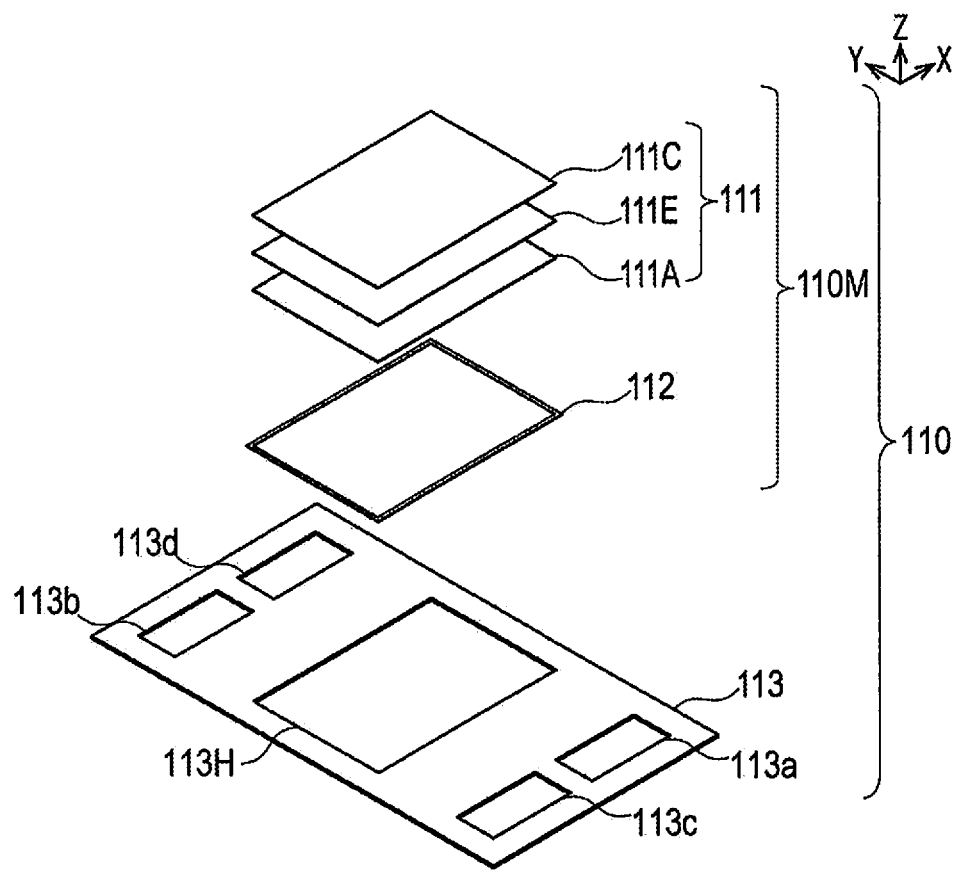
FIG. 3 is an exploded perspective view of a metal support cell assembly shown in FIG. 2.
Figure 4:
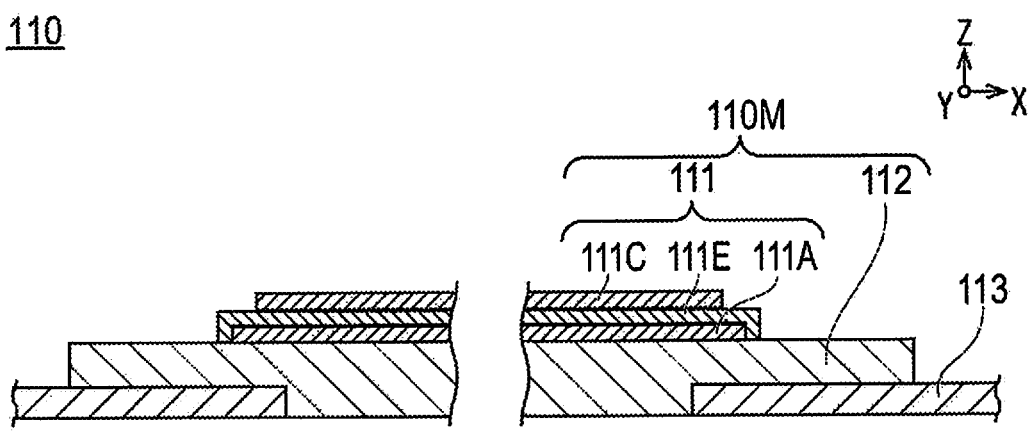
FIG. 4 is a partial cross-sectional view of the metal support cell assembly along line 4-4 in FIG. 2.

FIG. 3 is an exploded perspective view of the metal support cell assembly 110, and FIG. 4 is a partial cross-sectional view thereof. As shown in FIGS. 3 and 4, the metal support cell assembly 110 has a metal support cell (MSC) 110M and a cell frame 113 that holds the outer circumference of the metal support cell 110M.

As shown in FIGS. 3 and 4, the metal support cell 110M has a power generation cell 111 and a metal support portion 112 made of metal that supports the power generation cell 111 from one side in the vertical direction. The metal support cell 110M has better mechanical strength and more rapid activating ability than electrolyte-supported cells and electrode-supported cells.

Power Generation Cell 111

As shown in FIGS. 3 and 4, the power generation cell 111 is formed by stacking, on both sides of an electrolyte layer 111E, a pair of electrodes, an anode layer 111A and a cathode layer 111C.

The anode layer 111A is a fuel electrode, and causes an anode gas (for example, hydrogen) to react with oxide ions, thereby generating an oxide of the anode gas and extract electrons. The anode layer 111A is resistant to a reducing atmosphere, allows the anode gas to pass therethrough, has high electrical conductivity, and has a catalytic action causing the anode gas to react with the oxide ions. An example of a material forming the anode layer 111A is cemented carbide in which, for example, a metal such as nickel and an oxide ion conductor such as yttria-stabilized zirconia are mixed.

The cathode layer 111C is an oxidant electrode, and causes a cathode gas (for example, oxygen contained in air) to react with electrons to convert oxygen molecules to oxide ions. The cathode layer 111C is resistant to oxidizing atmosphere, allows the cathode gas to pass therethrough, has high electric conductivity, and has a catalytic action to convert oxygen molecules into oxide ions. Examples of a material forming the cathode layer 111C include oxides of lanthanum, strontium, manganese, or cobalt.

The electrolyte layer 111E allows oxide ions to pass from the cathode layer 111C to the anode layer 111A. The electrolyte layer 111E allows oxide ions to pass but does not allow gas and electrons to pass. An example of a material forming the electrolyte layer 111E is a solid oxide ceramic, such as stabilized zirconia in which yttria, neodymium oxide, samaria, gadria, scandia, and the like are dissolved.

Metal Support Portion 112

As shown in FIGS. 3 and 4, the metal support portion 112 supports the power generation cell 111 on the anode layer 111A side. By supporting the power generation cell 111 with the metal support portion 112, it is possible to suppress damage of the power generation cell 111 due to bending, even if a slight bias in the surface pressure distribution occurs in the power generation cell 111. The metal support portion 112 is a porous metal having gas permeability and electrical conductivity. Examples of a material forming the metal support portion 112 include corrosion-resistant alloys containing nickel and chromium, corrosion-resistant steel, and stainless steel.

Cell Frame 113

As shown in FIGS. 3 and 4, the cell frame 113 holds the metal support cell 110M from the periphery. As shown in FIG. 3, the cell frame 113 has an opening 113H. The metal support cell 110M is disposed in the opening 113H of the cell frame 113. The outer circumference of the metal support cell 110M is joined to the inner edge of the opening 113H of the cell frame 113. An example of a material forming the cell frame 113 is a metal whose surface is subjected to an insulation treatment.

As shown in FIG. 3, the cell frame 113 has an anode gas inlet 113a and an anode gas outlet 113b through which the anode gas flows, and a cathode gas inlet 113c and a cathode gas outlet 113d through which the cathode gas flows.

Figure 5:
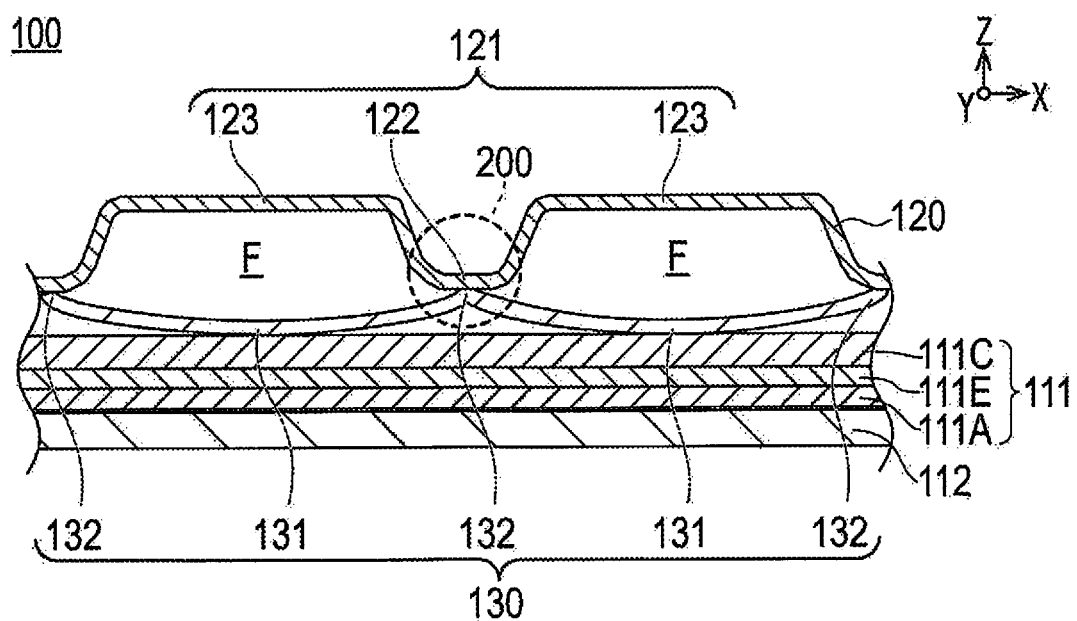
FIG. 5 is a cross-sectional view showing a portion of a stacked structure of the cell unit according to the first embodiment.
Figure 6:
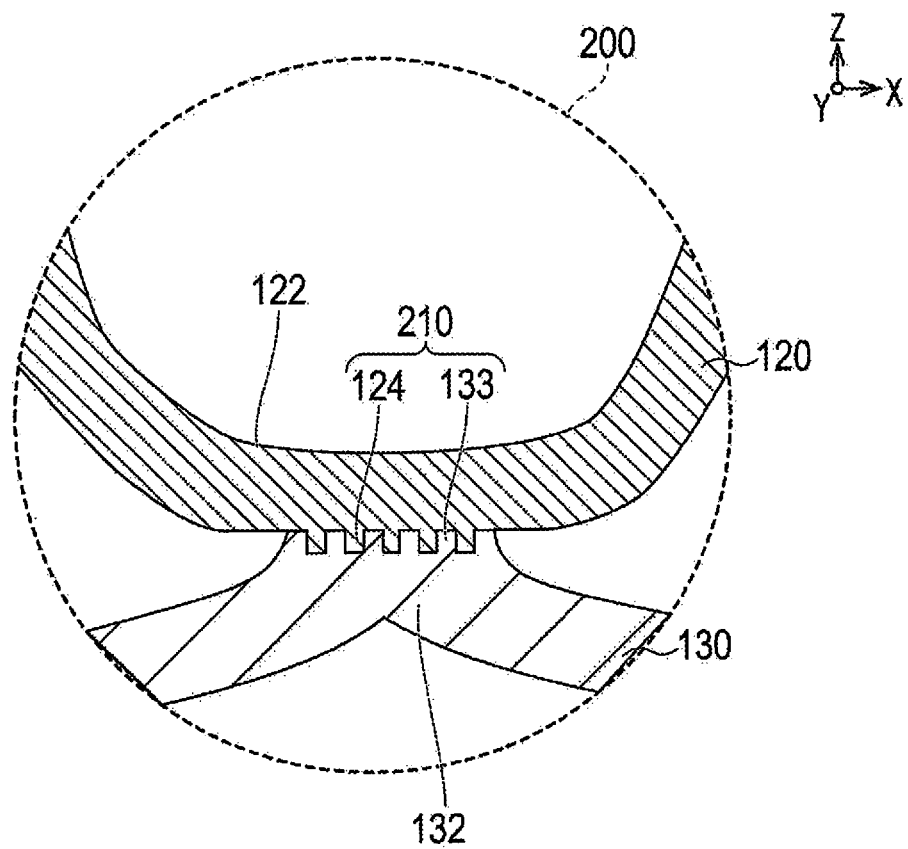
FIG. 6 is an enlarged cross-sectional view showing a connecting portion of the cell unit shown in FIG. 5.

FIG. 5 is a cross-sectional view showing a portion of a stacked structure of the cell unit 100. As shown in FIG. 5, the cell unit 100 has a connecting portion 200 that connects the auxiliary collector layer 130 and the separator 120. FIG. 6 is an enlarged cross-sectional view showing the connecting portion 200 of the cell 100.

The configurations of the auxiliary collector layer 130 and the separator 120 are described in detail below, after which the configuration of the connecting portion 200 is described in detail.

Separator 120

As shown in FIG. 2, the separator 120 has flow passage portions 121 in a region opposing the power generation cell 111 of the metal support cell 110M.

As shown in FIG. 5, the flow passage portions 121 of the separator 120 are formed of portions where a flat plate is formed into convex/concave shapes. The flow passage portions 121 have a plurality of protruding portions 122 protruding toward the auxiliary collector layer 130 in the cell unit 100, and flat portions 123 that are formed between adjacent protruding portions 122 and that are essentially flat along the XY-plane direction. The separator 120 defines gas flow passages F in portions surrounded by adjacent protruding portions 122, the flat portion 123, and the auxiliary collector layer 130.

As shown in FIG. 6, the protruding portion 122 has convex/concave shapes on the surface opposing the auxiliary collector layer 130. The convex/concave shapes constitute an engaged portion 124 that engages with an engagement portion 133 of the auxiliary collector layer 130 described further below.

As shown in FIG. 2, the flow passage portions 121 of the separator 120 are formed in an essentially linear shape such that the convex/concave shapes extend in the longitudinal direction Y. As a result, the direction of flow of the gas flowing along the flow passage portions 121 is the longitudinal direction Y. While not particularly limited, an example of a material forming the separator 120 is a metal.

As shown in FIG. 2, the separator 120 has an anode gas inlet 125a and an anode gas outlet 125b through which the anode gas flows, and a cathode gas inlet 125c and a cathode gas outlet 125d through which the cathode gas flows.

Auxiliary Collector Layer 130

As shown in FIG. 5, the auxiliary collector layer 130 is disposed between the power generation cell 111 and the separator 120. The auxiliary collector layer 130 has a plurality of curved portions 131 that are curved in an arch shape so as to protrude toward the power generation cell 111 in the cell unit 100, and inflection portions 132 that are provided continuously at both ends of the curved portions 131, and that have a different curvature from that of the curved portions 131.

The curved portions 131 are disposed so as to overlap the flat portions 123 of the flow passage portions 121 of the separator 120, in which the gas flow passages F are formed. The curved portions 131 define the gas flow passages F together with the flow passage portions 121 of the separator 120.

As shown in FIG. 6, the inflection portion 132 has convex/concave shapes on the surface opposing the separator 120. The convex/concave shapes constitute the engagement portion 133 that engages with the engaged portion 124 of the separator 120.

Figure 7:
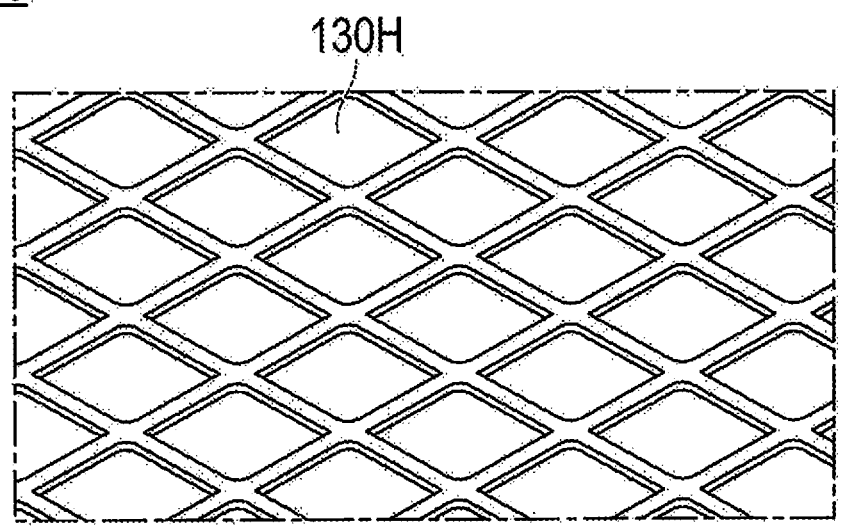
FIG. 7 is an enlarged view showing a portion of an auxiliary collector layer.

FIG. 7 is an enlarged view showing a portion of the auxiliary collector layer 130. As shown in FIG. 7, the auxiliary collector layer 130 is made of expanded metal, which is a conductive porous body in which a plurality of holes 130H are formed. As a result, it is possible to ensure gas diffusibility by forming a space through which gas passes by means of the plurality of holes 130H, and to improve electron conductivity by assisting the electrical contact between the power generation cell 111 and the separator 120. The conductive porous body forming the auxiliary collector layer 130 is not limited to an expanded metal, and a foam metal or a mesh metal may be used, for example.

Connecting Portion 200

As shown in FIG. 5, the connecting portion 200 is formed by connecting the inflection portion 132 of the auxiliary collector layer 130 and the protruding portion 122 of the separator 120. Since the auxiliary collector layer 130 and the separator 120 are thereby connected, the electron conductivity can be further improved.

As shown in FIG. 6, the connecting portion 200 has a regulating portion 210 for regulating the relative displacement between the inflection portion 132 of the auxiliary collector layer 130 and the protruding portion 122 of the separator 120 in the XY-plane direction that is orthogonal to the stacking direction. The regulating portion 210 suppresses relative displacement of the inflection portion 132 of the auxiliary collector layer 130 and the protruding portion 122 of the separator 120 in the XY-plane direction; therefore, the state of connection of the separator 120 and the auxiliary collector layer 130 at the connecting portion 200 can be reliably maintained.

In the present embodiment, as shown in FIG. 6, the regulating portion 210 is composed of the engaged portion 124 of the separator 120 and the engagement portion 133 of the auxiliary collector layer 130. It is possible to suppress the inflection portion 132 of the auxiliary collector layer 130 from being relatively displaced with respect to the protruding portion 122 of the separator 120 by engaging the engaged portion 124 and the engagement portion 133.

Figure 8:
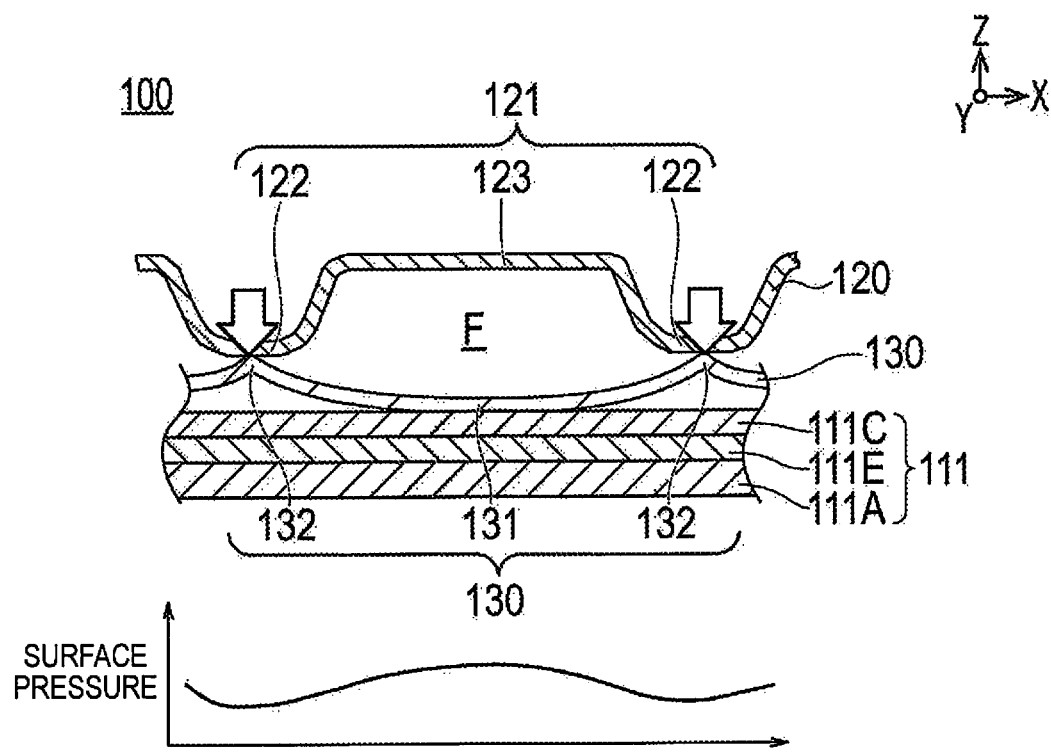
FIG. 8 has an upper diagram that illustrates a state in which a load in the stacking direction is applied to the cell unit shown in FIG. 5, and a lower diagram that illustrates the distribution of the surface pressure applied to the power generation cell.
Figure 9:
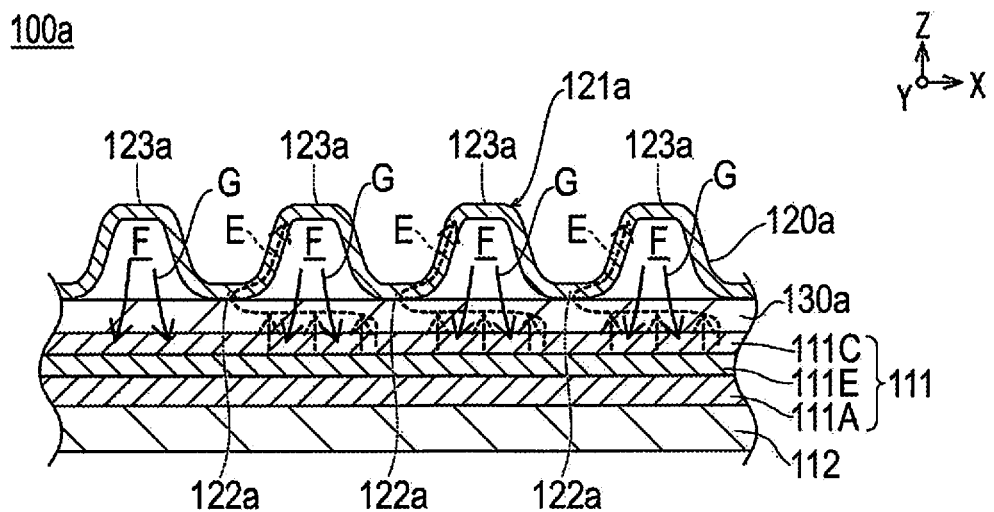
FIG. 9 is a cross-sectional view of a cell unit according to Comparative Example 1.
Figure 10:
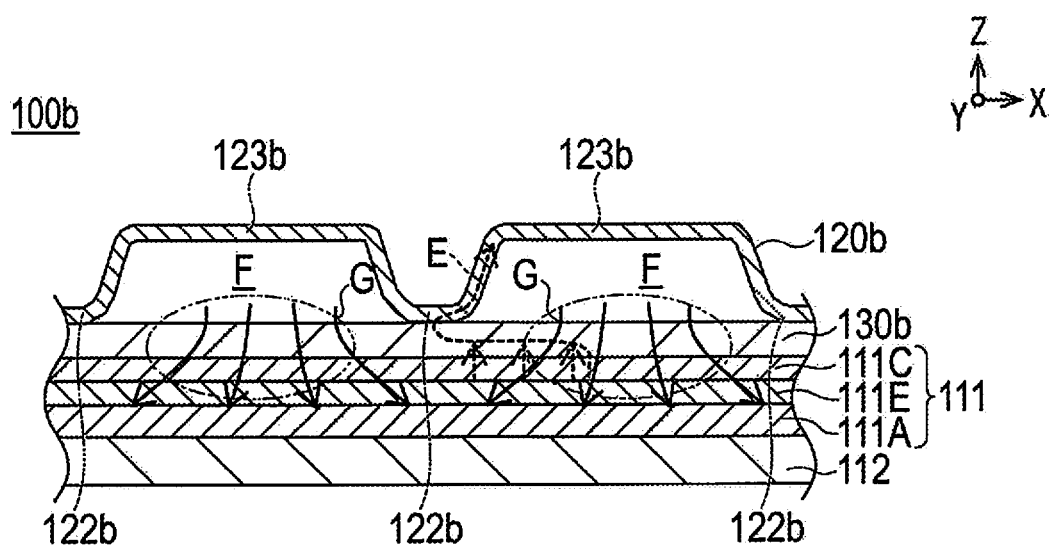
FIG. 10 is a cross-sectional view of a cell unit according to Comparative Example 2.
Figure 11:
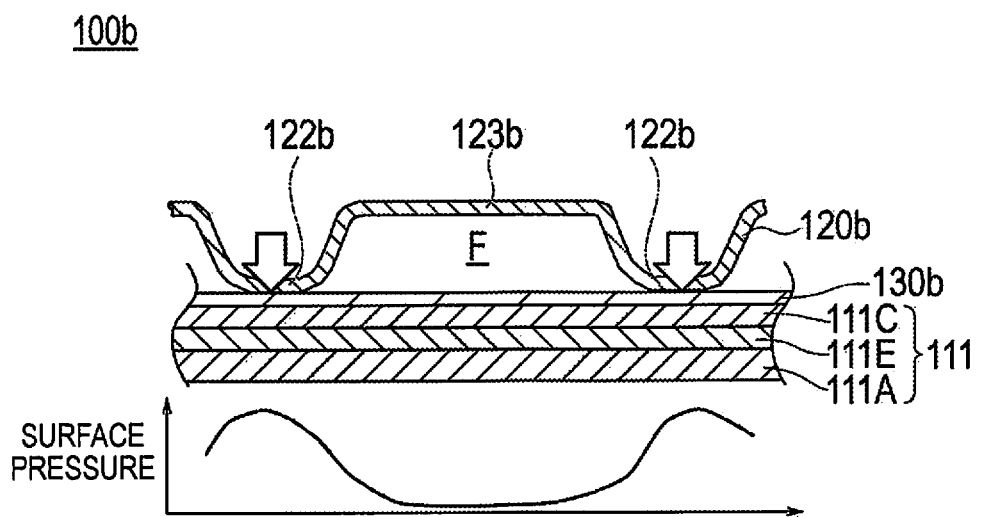
FIG. 11 has an upper diagram that illustrates a state in which a load in the stacking direction is applied to the cell unit shown in FIG. 10, and a lower diagram that illustrates the distribution of the surface pressure applied to the power generation cell.
Figure 12:
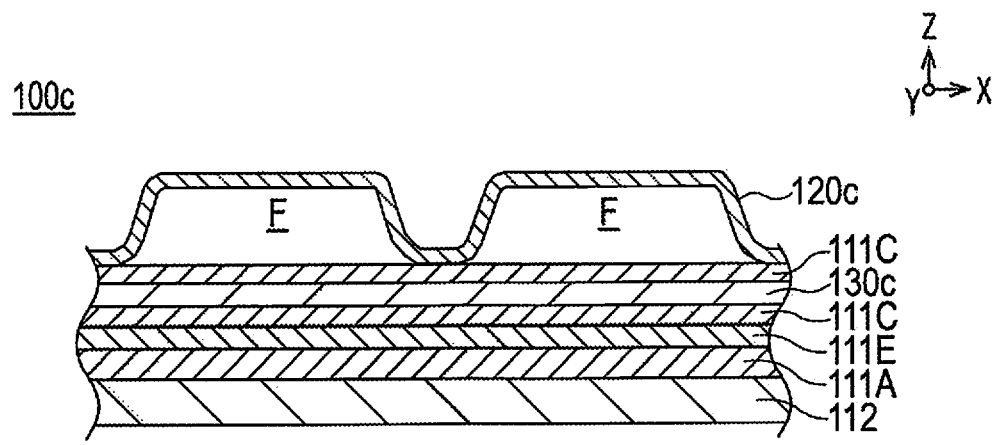
FIG. 12 is a cross-sectional view of a cell unit according to Comparative Example 3.

The action and effects of the cell unit 100 according to the present embodiment will be described below in comparison with cell units 100a, 100b, 100c according to comparative examples, with reference to FIGS. 8 to 12. The upper diagram of FIG. 8 illustrates a state in which a load (white arrow) in the stacking direction is applied to the cell unit 100 according to the present embodiment, and the lower diagram of FIG. 8 illustrates the distribution of the surface pressure applied to the power generation cell 111. FIG. 9 is a cross-sectional view of the cell unit 100a according to Comparative Example 1. FIG. 10 is a cross-sectional view of the cell unit 100b according to Comparative Example 2. The upper diagram of FIG. 11 illustrates a state in which a load (white arrow) in the stacking direction is applied to the cell unit 100b according to Comparative Example 2, and the lower diagram of FIG. 11 illustrates the distribution of the surface pressure applied to the power generation cell 111. FIG. 12 is a cross-sectional view of the cell unit 100c according to Comparative Example 3. The horizontal axis of the surface pressure distribution in the lower diagram of FIG. 8 and the lower diagram of FIG. 11 corresponds to the X direction in the upper diagram of FIG. 8 and the upper diagram of FIG. 11, respectively.

For example, as in the cell unit 100a according to Comparative Example 1 shown in FIG. 9, when the number of protruding portions 122a of a separator 120a is increased, the contact area between the separator 120a and an auxiliary collector layer 130a increases. As a result, the contact resistance between the separator 120 and the auxiliary collector layer 130a decreases and electrons E are easily conducted as indicated by the broken arrow, so that the electron conductivity of the cell unit 100a is improved. However, if the number of protruding portions 122a of the separator 120a is increased, the area of flat portions 123a that define the gas flow passages F for the gas G decreases. Consequently, the cross-sectional area of the gas flow passage F becomes smaller and the pressure loss of the gas G increases while the gas diffusibility decreases. In addition, since the shape of flow passage portions 121a of the separator 120 becomes complex, manufacturability decreases.

On the other hand, as in the cell unit 100b according to Comparative Example 2 shown in FIG. 10, when the number of protruding portions 122b of a separator 120b is decreased and the area of the flat portions 123b is increased, the cross-sectional area of the gas flow passage F increases, so that it becomes possible to reduce the pressure loss of the gas G while improving the gas diffusibility. However, since the contact area between the separator 120b and an auxiliary collector layer 130b decreases, the electron conductivity of the cell unit 100b is reduced.

Moreover, as shown in FIG. 11, the load in the stacking direction is concentrated only on the protruding portion 122b of the separator 120b according to Comparative Example 2, so that the contact surface pressure with respect to the auxiliary collector layer 130b is lost at the flat portions 123b forming the gas flow passages F for the gas G. As a result, the contact resistance of the cell unit 100b increases and the electron conductivity decreases.

In addition, as in the cell unit 100c according to Comparative Example 3 shown in FIG. 12, it is conceivable to embed an auxiliary collector layer 130c in the cathode layer 111C of the power generation cell 111 in order to reduce the contact resistance of the cell unit 100c. However, since the auxiliary collector layer 130c is embedded in the cathode layer 111C, there is the risk that the contact resistance between the separator 120c and the auxiliary collector layer 130c increases. As a result, the contact resistance of the cell unit 100c increases and the electron conductivity decreases.

In contrast thereto, as shown in the upper diagram of FIG. 8, in the cell unit 100 according to the present embodiment the curved portions 131 of the auxiliary collector layer 130 are disposed so as to overlap the flat portions 123 of the flow passage portions 121 of the separator 120, in which the gas flow passages F are formed. As shown in the lower diagram of FIG. 8, load is concentrated at the portion where the power generation cell 111 and the portion of the curved portion 131 of the auxiliary collector layer 130 protruding toward the power generation cell 111 abut each other the contact surface pressure becomes higher than at the other portions. Thus, it is possible to prevent loss of surface pressure at the portion overlapping the flat portions 123 of the flow passage portions 121 of the separator 120 in the stacking direction, where the contact surface pressure becomes relatively small, and to reduce the contact resistance between the auxiliary collector layer 130 and the power generation cell 111.

In addition, as shown in FIG. 1, the fuel cell stack 10 is configured by stacking a plurality of the cell units 100. As a result, by adjusting the arrangement of the inflection portion 132 of the auxiliary collector layer 130 and the protruding portion 122 of the separator 120 in the cell unit 100, it is possible to apply surface pressure to the power generation cell 111 symmetrically between the cathode layer 111C and the anode layer 111A with respect to the electrolyte layer 111E. As a result, even if the distribution of the surface pressure applied to the cathode layer 111C side is not uniform, it is possible to apply a symmetrical surface pressure distribution on the anode layer 111A side, thereby suppressing damage of the power generation cell 111 (particularly, the electrolyte layer 111E) due to bending.

Moreover, the curved portion 131 of the auxiliary collector layer 130 is curved in an arch shape so as to transmit the force received in the stacking direction in the XY-plane direction. Here, relative displacement of the inflection portions 132, provided continuously at both ends of the curved portion 131, in the XY-plane direction with respect to the protruding portion 122 of the separator 120 is restricted by the regulating portion 210. Thus, both ends of the curved portion 131 are fixed, and thus the force transmitted in the XY-plane direction by the curved portion 131 does not escape. As a result, it is possible to reliably maintain the contact surface pressure at the curved portion 131. In addition, by making the curved portion 131 arch-shaped, it is possible to suppress the curved portion 131 from being crushed and deformed. Thus, it is possible to maintain the contact surface pressure at the curved portion 131 for a long period of time.

As described above, the cell unit 100 according to the present embodiment is made by sequentially stacking the power generation cell 111 including the cathode layer 111C, the electrolyte layer 111E, and the anode layer 111A, the auxiliary collector layer 130 that assists electrical contact, and the separator 120 provided with the flow passage portions 121 that define the gas flow passages F for the gas. The auxiliary collector layer 130 has the curved portion 131 that is disposed so as to overlap the gas flow passages F in the stacking direction, and that is curved so as to project toward the power generation cell 111 side.

By means of the above-described cell unit 100, load is concentrated at the portion where the power generation cell 111 and the portion of the curved portion 131 of the auxiliary collector layer 130 protruding toward the power generation cell 111 abut each other; therefore, the contact surface pressure becomes higher than at the other portions. Thus, it is possible to reduce the contact resistance between the auxiliary collector layer 130 and the power generation cell 111 at the portion overlapping the gas flow passages F in the stacking direction, where the contact surface pressure becomes relatively small (contact resistance is relatively increased). Thus, it is possible to ensure the electron conductivity even if the flow passage portions 121 of the separator 120 are formed large. As a result, the cell unit 100 can achieve both good gas diffusibility and good electron conductivity, and improve power generation performance.

Additionally, the cell unit 100 has the connecting portion 200 that connects the auxiliary collector layer 130 and the separator 120. Since the auxiliary collector layer 130 and the separator 120 are connected by means of the connecting portion 200, the electron conductivity can be further improved.

In addition, the connecting portion 200 has the regulating portion 210 for regulating the relative displacement between the auxiliary collector layer 130 and the separator 120 in the XY-plane direction that is orthogonal to the stacking direction. Since the regulating portion 210 suppresses the auxiliary collector layer 130 and the separator 120 from being displaced relative to each other in the planar direction, the state of connection of the separator 120 and the auxiliary collector layer 130 at the connecting portion 200 can be reliably maintained. Thus, it is possible to reduce the contact resistance between the separator 120 and the auxiliary collector layer 130.

Additionally, the auxiliary collector layer 130 has the plurality of curved portions 131, and the inflection portions 132 that are provided continuously at both ends of the curved portions 131, and that have a different curvature from that of the curved portions 131. Moreover, the connecting portion 200 connects the inflection portion 132 of the auxiliary collector layer 130 and the separator 120. By connecting the separator 120 and the inflection portion 132, which has a different curvature from that of the curved portion 131, the connection can easily be made.

In addition, the inflection portion 132 has the engagement portion 133 that engages with the separator 120. Thus, it is possible to suppress the inflection portion 132 from being relatively displaced with respect to the separator 120.

Additionally, the flow passage portions 121 of the separator 120 have convex/concave shapes, which include a plurality of the protruding portions 122 projecting toward the auxiliary collector layer 130. The connecting portion 200 is formed by connecting the protruding portion 122 of the separator 120 and the inflection portion 132 of the auxiliary collector layer 130. Thus, it is possible to secure the cross-sectional area of the gas flow passages F, and suppress pressure loss of the gas.

In addition, the metal support portion 112, which is made of metal and supports the power generation cell 111, also is provided. Thus, it is possible to suppress damage of the power generation cell 111 (particularly, the electrolyte layer 111E) due to bending, even if a slight bias in the surface pressure distribution occurs in the power generation cell 111.

Additionally, the auxiliary collector layer 130 is made of a conductive porous body. As a result, it is possible to improve gas diffusibility by forming a space through which gas passes, and to improve the electron conductivity by assisting electrical contact between the power generation cell 111 and the separator 120.

Modification of the First Embodiment

Figure 13:
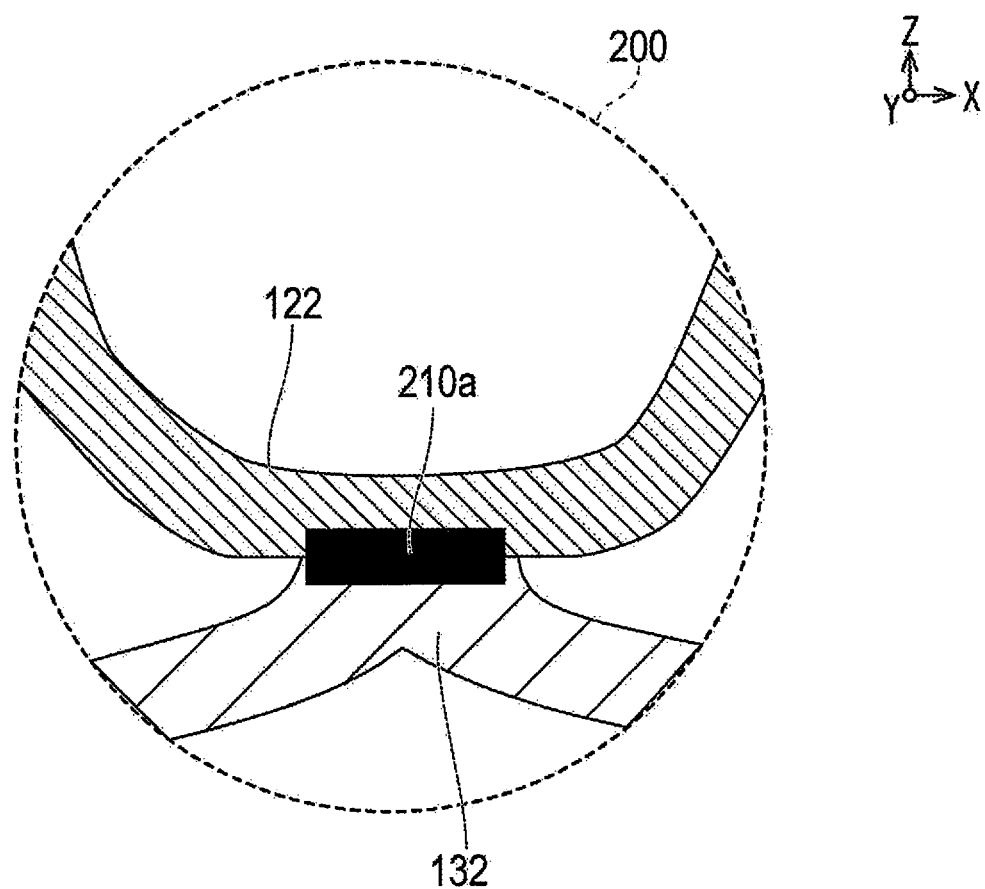
FIG. 13 is a cross-sectional view showing a regulating portion of a cell unit according to a modification of the first embodiment.

FIG. 13 is a cross-sectional view showing a regulating portion 210a of a cell unit according to a modification of the first embodiment. The above-described regulating portion 210 according to the first embodiment is composed of the engaged portion 124 of the separator 120 and the engagement portion 133 of the auxiliary collector layer 130. The regulating portion 210a according to the modification of the first embodiment is different from the above-described first embodiment in the point of being composed of a welded portion. Since the other configurations are the same as those of the first embodiment described above, descriptions thereof are omitted.

The regulating portion 210a is composed of a welded portion obtained by welding the protruding portion 122 of the separator 120 and the inflection portion 132 of the auxiliary collector layer 130. Thus, it is possible to more reliably suppress the protruding portion 122 of the separator 120 and the inflection portion 132 of the auxiliary collector layer 130 from being displaced relative each other in the XY-plane direction.

Second Embodiment

Figure 14:
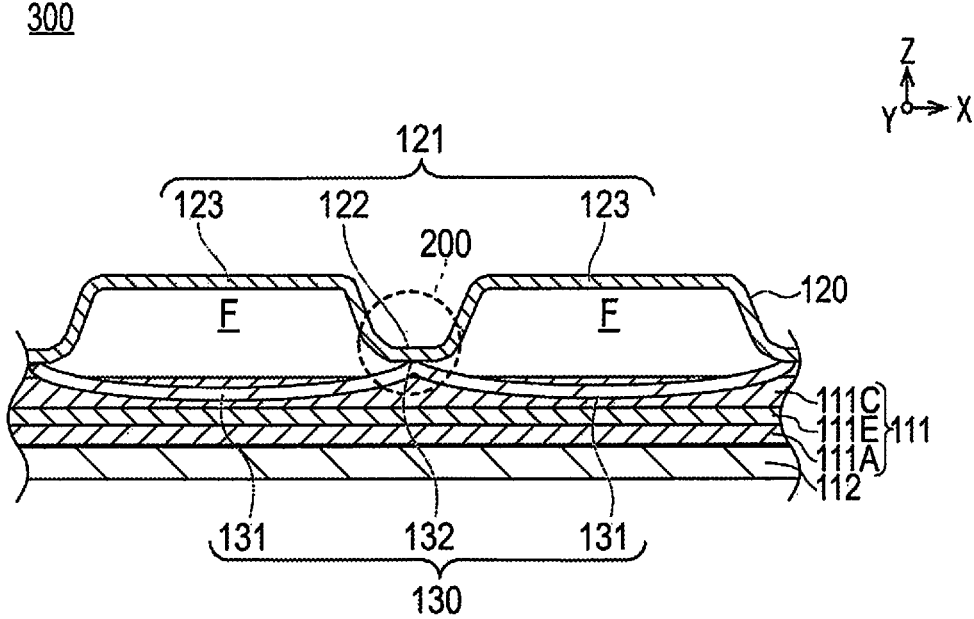
FIG. 14 is a cross-sectional view of a cell unit according to a second embodiment.
Figure 15:
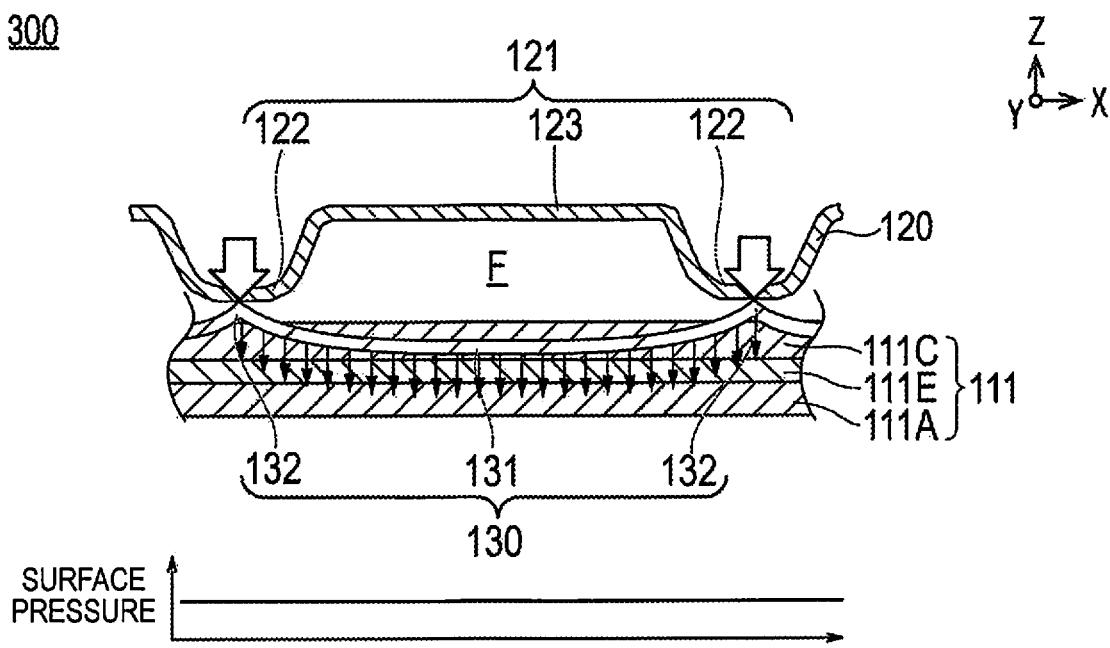
FIG. 15 has an upper diagram that illustrates a state in which a load in the stacking direction is applied to the cell unit shown in FIG. 14, and a lower diagram that illustrates the distribution of the surface pressure applied to the power generation cell.

FIG. 14 is a cross-sectional view of a cell unit 300 according to a second embodiment. The upper diagram of FIG. 15 illustrates a state in which a load (white arrow) in the stacking direction is applied to the cell unit 300 shown in FIG. 14, and the lower diagram of FIG. 15 illustrates the distribution of the surface pressure applied to the power generation cell 111. The horizontal axis of the surface pressure distribution in the lower diagram of FIG. 15 corresponds to the X direction in the upper diagram of FIG. 15.

As shown in FIG. 14, the cell unit 300 according to the second embodiment is different from that of the above-described first embodiment in the point that at least a portion of the curved portion 131 of the auxiliary collector layer 130 is embedded in the cathode layer 111C of the power generation cell 111. The same reference symbols have been assigned to configurations that are the same as in the first embodiment described above, and the descriptions thereof have been omitted.

As shown in the upper diagram of FIG. 15, at least a portion of the curved portion 131 of the auxiliary collector layer 130 is embedded in the cathode layer 111C of the power generation cell 111. The curved portion 131 can thereby transmit force to the power generation cell 111 in the vicinity of the connecting portion 200. The auxiliary collector layer 130 can thereby transmit the force more uniformly to the power generation cell 111. As a result, as shown in the lower diagram of FIG. 15, it is possible to make the distribution of the surface pressure applied to the power generation cell 111 more uniform. Additionally, it is possible to increase the contact area and to reduce the contact resistance between the cathode layer 111C and the auxiliary collector layer 130.

As described above, in the cell unit 300 according to the second embodiment, at least a portion of the curved portion 131 of the auxiliary collector layer 130 is embedded in the cathode layer 111C. Thus, it is possible to suppress the loss of surface pressure in the vicinity of the connecting portion 200. It is possible to increase the contact area between the auxiliary collector layer 130 and the power generation cell 111 and to make the distribution of the surface pressure applied to the power generation cell 111 more uniform. In addition, it is possible to increase the contact area between the cathode layer 111C and the auxiliary collector layer 130. As a result, it is possible to reduce the contact resistance and to further improve the electron conductivity.

The cell unit according to the present invention has been described above by means of embodiments and modifications; however, the present invention is not limited to the content described in the embodiments and the modifications, and may be modified appropriately based on the descriptions of the Claims.

For example, the flow passage portions of the separator were described as having convex/concave shapes including protruding portions and flat portions, but the separator may be a flat separator composed of only flat portions. In this case, flow passage portions may be formed between the separator and ribs formed of a conductive member different from the separator. For example, the inflection portion of the auxiliary collector layer may be used as a rib, and flow passage portions may be formed between the curved portion and the separator.

In addition, as long as it is possible to regulate the relative displacement between the separator and the auxiliary collector layer at the connecting portion, the regulating portion is not limited to the above-described configurations in which the regulating portion is configured from the engagement portion or the welded portion. For example, the regulating portion may be configured by attaching the separator and the auxiliary collector layer at the connecting portion by means of an adhesive.

Additionally, the cell unit may be configured by appropriately combining the specifications of the modifications and embodiments described above.

The invention claimed is:

1. A cell unit for a solid oxide fuel cell comprising a sequential stack of:
   a power generation cell including a cathode layer, an electrolyte layer, and an anode layer;
   an auxiliary collector layer that assists electrical contact; and
   a separator provided with at least one flow passage portion and at least one gas flow passage, each of the at least one flow passage portion defining one of the at least one gas flow passage, wherein
   the auxiliary collector layer has at least one curved portion that is disposed so as to overlap a single one of the at least one gas flow passage in a stacking direction, and that is curved in an arch shape so as to project toward a power generation cell side, the one curved portion overlapping the single one of the one gas flow passage, and the one curved portion having shape of a continuously bending line over an entire width of the single one of the one gas flow passage.

2. The cell unit according to claim 1, further comprising a connecting portion that connects the auxiliary collector layer and the separator.

3. The cell unit according to claim 2, wherein
   the connecting portion has a regulating portion for regulating relative displacement between the auxiliary collector layer and the separator in a planar direction that is orthogonal to the stacking direction.

4. The cell unit according to claim 2, wherein
   at least a portion of the at least one curved portion of the auxiliary collector layer is embedded in the cathode layer.

5. The cell unit according to claim 4, wherein
   the auxiliary collector layer has a plurality of curved portions that includes the at least one curved portion, and a plurality of inflection portions that are provided continuously at both ends of each of the plurality of curved portions, and that have a different curvature from that of the plurality of curved portions, and
   the connecting portion is formed by connecting the separator and the inflection portion of the auxiliary collector layer.

6. The cell unit according to claim 5, wherein
   the inflection portion has an engagement portion that engages with the separator.

7. The cell unit according to claim 5, wherein
   the at least one flow passage portion of the separator has a convex-concave shape, which includes a plurality of protruding portions projecting toward the auxiliary collector layer, and the connecting portion is formed by connecting the protruding portions of the separator and the inflection portion of the auxiliary collector layer.

8. The cell unit according to claim 2, further comprising a metal support portion that is made of metal and that supports the power generation cell.

9. The cell unit according to claim 2, wherein the auxiliary collector layer is made of a conductive porous body.

10. A cell unit for a solid oxide fuel cell comprising a sequential stack of:
a power generation cell including a cathode layer, an electrolyte layer, and an anode layer,
an auxiliary collector layer that assists electrical contact; and
a separator provided with at least one flow passage portion and at least one gas flow passage, each of the at least one gas flow passage portion defining one of the at least one gas flow passage, wherein
the auxiliary collector layer has at least one curved portion that is disposed so as to overlap a single one of the at least one gas flow passage in a stacking direction, and that is curved in an arch shape so as to project toward a power generation cell side, each of the one curved portion overlapping a single respective one of the one gas flow passage such that each curved portion corresponds to a single gas flow passage and each gas flow passage corresponds to a single curved portion.

11. The cell unit according to claim 10, further comprising a connecting portion that connects the auxiliary collector layer and the separator.

12. The cell unit according to claim 11, wherein the connecting portion has a regulating portion for regulating relative displacement between the auxiliary collector layer and the separator in a planar direction that is orthogonal to the stacking direction.

13. The cell unit according to claim 11, wherein at least a portion of the at least one curved portion of the auxiliary collector layer is embedded in the cathode layer.

14. The cell unit according to claim 13, wherein the auxiliary collector layer has a plurality of curved portions that includes the at least one curved portion, and a plurality of inflection portions that are provided continuously at both ends of each of the plurality of curved portions, and that have a different curvature from that of the plurality of curved portions, and
the connecting portion is formed by connecting the separator and the inflection portion of the auxiliary collector layer.

15. The cell unit according to claim 14, wherein the inflection portion has an engagement portion that engages with the separator.

16. The cell unit according to claim 14, wherein the at least one flow passage portion of the separator has a convex-concave shape, which includes a plurality of protruding portions projecting toward the auxiliary collector layer, and
the connecting portion is formed by connecting the protruding portions of the separator and the inflection portion of the auxiliary collector layer.

17. The cell unit according to claim 11, further comprising a metal support portion that is made of metal and that supports the power generation cell.

18. The cell unit according to claim 11, wherein the auxiliary collector layer is made of a conductive porous body.

* * * * *